(12) United States Patent
Bianco et al.

(10) Patent No.: US 10,151,362 B1
(45) Date of Patent: Dec. 11, 2018

(54) RAPID CERAMIC MATRIX COMPOSITE FABRICATION OF AIRCRAFT BRAKES VIA FIELD ASSISTED SINTERING

(71) Applicant: GOODRICH CORPORATION, Charlotte, NC (US)

(72) Inventors: Robert Bianco, Bloomfield, CT (US); Sergey Mironets, Charlotte, NC (US); Gavin Charles Richards, Windsor, CT (US)

(73) Assignee: Goodrich Corporation, Charlotte, NC (US)

( * ) Notice: Subject to any disclaimer, the term of this patent is extended or adjusted under 35 U.S.C. 154(b) by 2 days.

(21) Appl. No.: 15/596,770

(22) Filed: May 16, 2017

(51) Int. Cl.
| | | |
|---|---|---|
| *F16D 65/12* | (2006.01) | |
| *C04B 35/80* | (2006.01) | |
| *C04B 35/645* | (2006.01) | |
| *C04B 35/628* | (2006.01) | |

(52) U.S. Cl.
CPC ........ *F16D 65/126* (2013.01); *C04B 35/6286* (2013.01); *C04B 35/62868* (2013.01); *C04B 35/645* (2013.01); *C04B 35/806* (2013.01); *C04B 2235/3821* (2013.01); *C04B 2235/3826* (2013.01); *C04B 2235/3873* (2013.01); *C04B 2235/5244* (2013.01); *C04B 2235/5248* (2013.01); *C04B 2235/5436* (2013.01); *C04B 2235/5454* (2013.01); *C04B 2235/666* (2013.01); *F16D 2200/006* (2013.01); *F16D 2200/0047* (2013.01); *F16D 2200/0052* (2013.01); *F16D 2200/0086* (2013.01); *F16D 2250/0023* (2013.01)

(58) Field of Classification Search
CPC ..................................................... F16D 65/126
USPC ......................................................... 428/66.2
See application file for complete search history.

(56) References Cited

U.S. PATENT DOCUMENTS

| | | | |
|---|---|---|---|
| 6,384,365 B1 | 5/2002 | Seth et al. | |
| 6,875,374 B1 | 4/2005 | Zhan et al. | |
| 9,463,489 B2 | 10/2016 | Allemand et al. | |
| 2014/0378294 A1* | 12/2014 | Corral | ................... C04B 35/632 501/99 |

FOREIGN PATENT DOCUMENTS

WO     2015019992     2/2015

* cited by examiner

*Primary Examiner* — Brent T O'Hern
(74) *Attorney, Agent, or Firm* — Snell & Wilmer L.L.P

(57) ABSTRACT

A method of making a ceramic matrix composite (CMC) brake component may include the steps of applying a pressure to a mixture comprising ceramic powder and chopped fibers, pulsing an electrical discharge across the mixture to generate a pulsed plasma between particles of the ceramic powder, increasing a temperature applied to the mixture using direct heating to generate the CMC brake component, and reducing the temperature and the pressure applied to the CMC brake component. The ceramic powder may have a micrometer powder size or a nanometer powder size, and the chopped fibers may have an interphase coating.

19 Claims, 5 Drawing Sheets

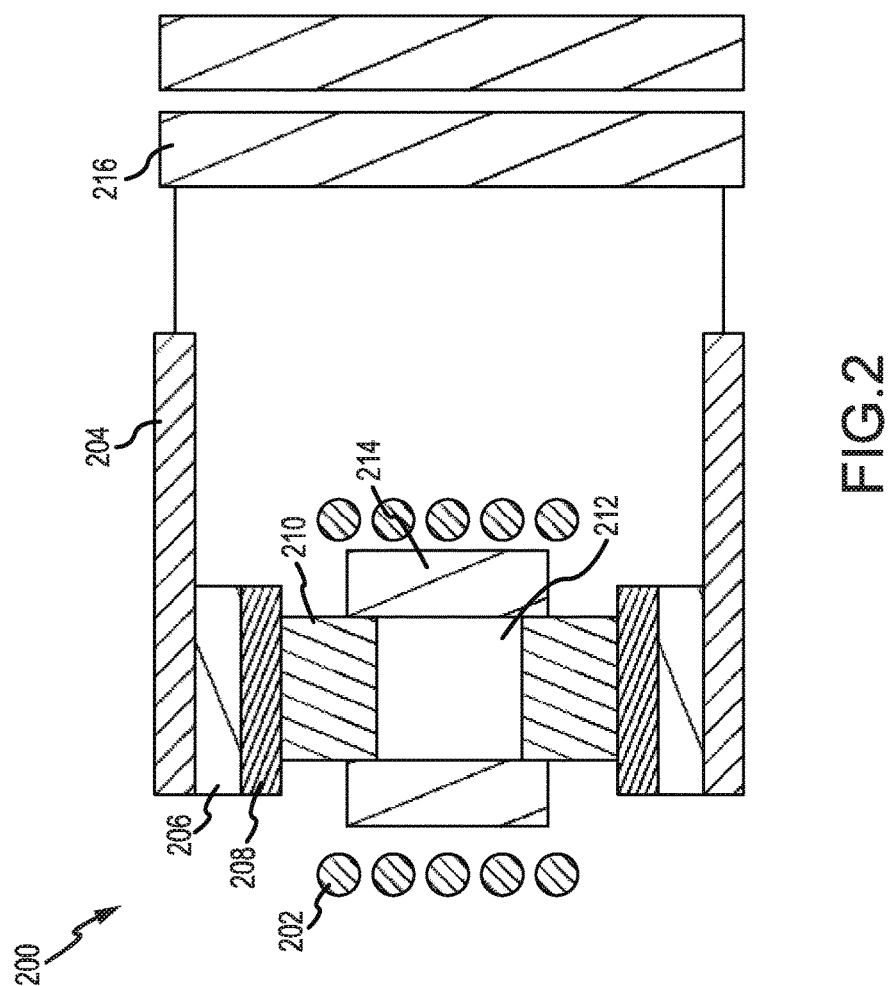

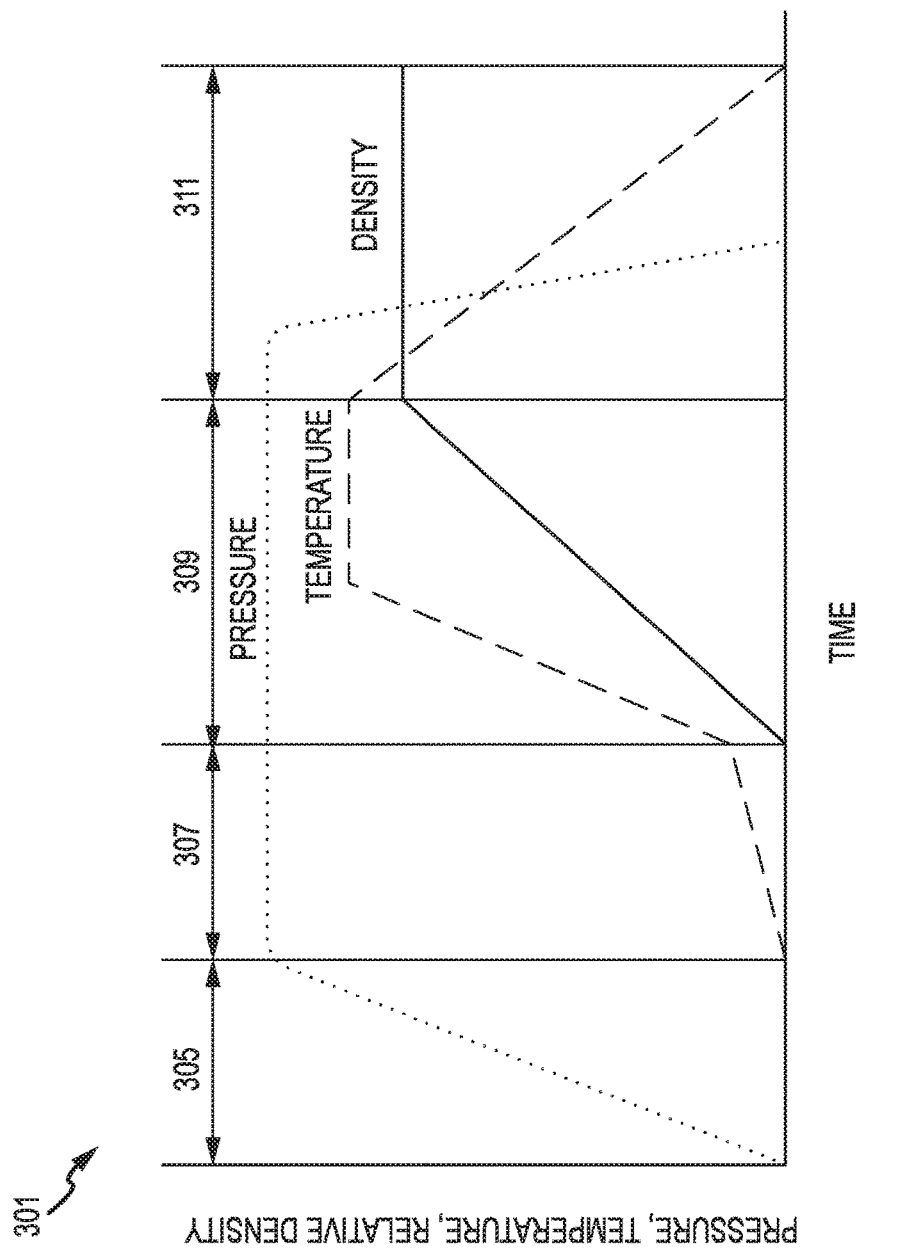

US 10,151,362 B1

RAPID CERAMIC MATRIX COMPOSITE FABRICATION OF AIRCRAFT BRAKES VIA FIELD ASSISTED SINTERING

FIELD

The disclosure relates generally to making aircraft brake components using field assisted sintering technique (FAST).

BACKGROUND

Carbon/carbon (C/C) composites are used in the aerospace industry for aircraft brake heat sink materials. Silicon carbide (SiC) based ceramic matrix composites (CMCs) have found use as brake materials in automotive and locomotive applications. These composites are typically produced using one or more of these three main methods: chemical vapor infiltration (CVI), melt infiltration (MI), and polymer impregnation and pyrolysis (PIP). However, each of these CMC fabrication methods has limitations. The processing time for both CVI and PIP, for example, can extend well over 100 hours. MI generated CMCs tend to contain residual silicon, which limits upper use temperature. Thus, existing processes typically run too long and/or have imprecise stoichiometric control for aerospace.

SUMMARY

A method of making a ceramic matrix composite (CMC) brake component is provided according to various embodiments. The method may include the steps of increasing a pressure in a mold containing a mixture comprising a ceramic powder and fibers, pulsing an electrical discharge across the mixture to generate a pulsed plasma between particles of the ceramic powder, and increasing a temperature in the mold using direct heating to generate the CMC brake component. The temperature and pressure applied to the CMC brake component may be reduced to complete the process.

In various embodiments, suitable ceramic powders may have a range of sizes on the order of micrometer powder size and/or a nanometer powder size. The ceramic powder may include SiC, $B_4C$, and/or $Si_3N_4$ $TiB_2$, or other oxides and/or borides, for example. The fibers may be chopped carbon fibers, chopped SiC fibers, chopped glass fibers, or chopped oxide fibers, for example. The mold may be made from graphite, refractory metals, and/or ceramics. The CMC brake component may be machined to form precise contours and/or openings. The direct heating may be accomplished using resistance heating and/or inductive heating. The CMC brake component may be a CMC brake disc, for example. The temperature applied to the mixture may increase a maximum temperature of about 2400° C. The pressure may be increased by actuating a punch to press against the mixture. The electrical discharges may be pulsed across the mixture through a graphite electrode coupled to the punch, a brass electrode coupled to the graphite electrode, and a copper plate coupled to the brass electrode. The electrical discharges may also be pulsed at a cycle time of substantially 10 minutes. The fibers may have an interphase coating made of, for example, pyrolytic carbon or boron nitride.

The method of making a CMC brake component may also include the steps of applying a pressure to a mixture comprising ceramic powder and chopped fibers, pulsing electrical discharges across the mixture to generate a pulsed plasma between particles of the ceramic powder, increasing a temperature applied to the mixture using direct heating to generate the CMC brake component, and reducing the temperature and the pressure applied to the CMC brake component. The ceramic powder may have a micrometer powder size or a nanometer powder size, and the chopped fibers may have an interphase coating.

In various embodiments, the ceramic powder may include SiC, $B_4C$, and/or $Si_3N_4$, oxides, and/or borides. The chopped fibers comprise at least one of chopped carbon fiber, chopped SiC fiber, chopped glass fiber, and/or chopped oxide fiber. The interphase coating may include pyrolytic carbon or boron nitride.

A CMC brake component for an aircraft is also provided. The CMC brake component may include an annular disc. The annular disc may include a ceramic material having a monolithic grain structure and comprising SiC, $B_4C$, and/or $Si_3N_4$. Chopped fibers may be dispersed within the ceramic material and may have an interphase coating. The chopped fibers may also include chopped carbon fiber, chopped SiC fiber, chopped glass fiber, and/or chopped oxide fiber.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 2 illustrates a schematic diagram of a FAST device for generating brake components using a FAST process, in accordance with various embodiments;

FIG. 3B illustrates a process of generating CMC brake components relative to time, in accordance with various embodiments.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1A:
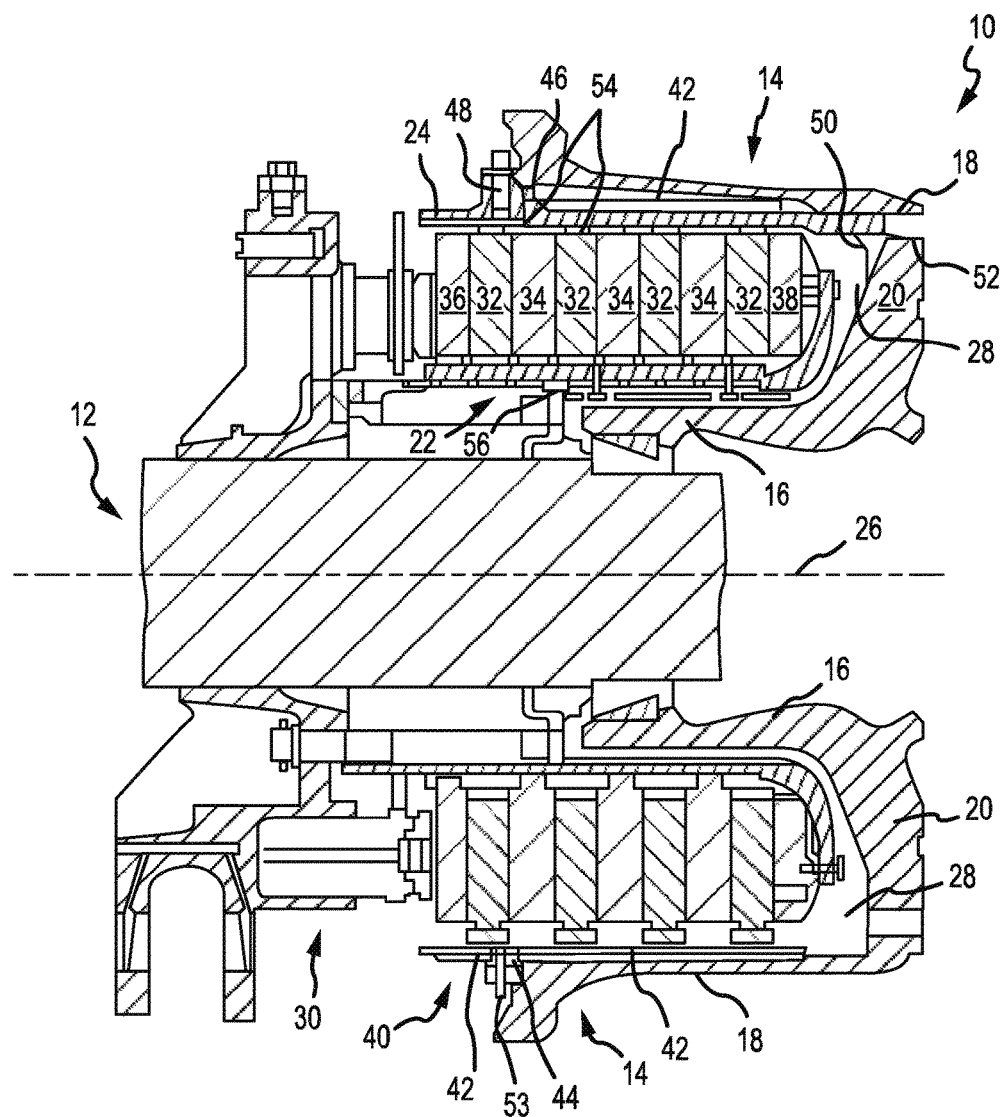
FIG. 1A illustrates a cross-sectional view of an exemplary aircraft brake system comprising various brake components, in accordance with various embodiments.
Figure 1B:
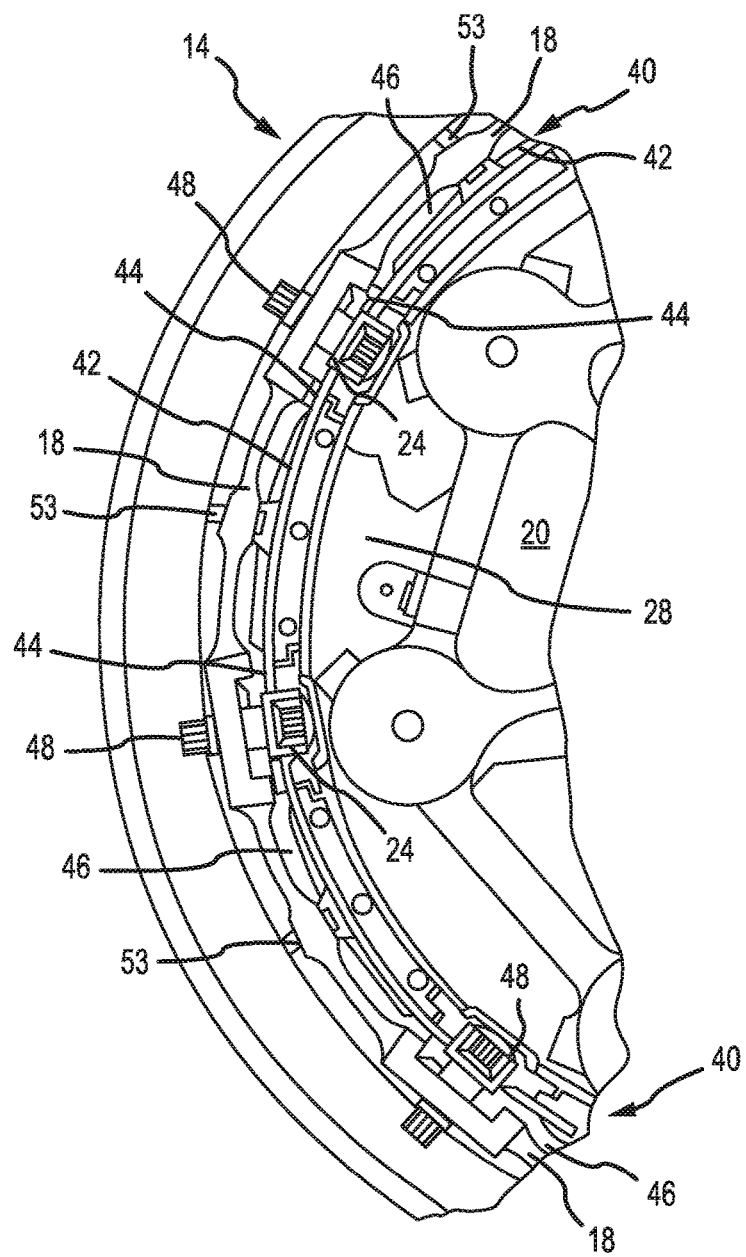
FIG. 1B illustrates a cutaway view of an exemplary aircraft brake system comprising various brake components, in accordance with various embodiments.

With initial reference to FIGS. 1A and 1B, an aircraft wheel braking assembly 10 that may be found on an aircraft is shown, in accordance with various embodiments. Aircraft wheel braking assembly may, for example, comprise a bogie axle 12, a wheel 14 including a hub 16 and a wheel well 18, a web 20, a torque take-out assembly 22, one or more torque bars 24, a wheel rotational axis 26, a wheel well recess 28, an actuator 30, multiple brake rotors 32, multiple brake stators 34, a pressure plate 36, an end plate 38, a heat shield 40, multiple heat shield sections 42, multiple heat shield carriers 44, an air gap 46, multiple torque bar bolts 48, a torque bar pin 50, a wheel web hole 52, multiple heat shield fasteners 53, multiple rotor lugs 54, and multiple stator slots 56. FIG. 1B illustrates a portion of aircraft wheel braking assembly 10 as viewed into wheel well 18 and wheel well recess 28.

Brake disks (e.g., interleaved rotors 32 and stators 34) are disposed in wheel well recess 28 of wheel well 18. Rotors 32 are secured to torque bars 24 for rotation with wheel 14, while stators 34 are engaged with torque take-out assembly 22. At least one actuator 30 is operable to compress interleaved rotors 32 and stators 34 for stopping the aircraft. In this example, actuator 30 is shown as a hydraulically actuated piston, but many types of actuators are suitable, such as an electromechanical actuator. Pressure plate 36 and end plate 38 are disposed at opposite ends of the interleaved rotors 32 and stators 34. Rotors 32 and stators 34 can comprise any material suitable for friction disks, including ceramics or carbon materials, such as a carbon/carbon composite.

Through compression of interleaved rotors 32 and stators 34 between pressure plates 36 and end plate 38, the resulting frictional contact slows rotation of wheel 14. Torque take-out assembly 22 is secured to a stationary portion of the landing gear truck s as a bogie beam or other landing gear strut, such that torque take-out assembly 22 and stators 34 are prevented from rotating during braking of the aircraft.

Carbon and/or ceramic structures in the friction disks may operate as a heat sink to absorb large amounts of kinetic energy converted to heat during slowing of the aircraft. Heat shield 40 may reflect thermal energy away from wheel well 18 and back toward rotors 32 and stators 34. With reference to FIG. 1A, a portion of wheel well 18 and torque bar 24 is removed to better illustrate heat shield 40 and heat shield sections 42. With reference to FIG. 1B, heat shield 40 is attached to wheel 14 and is concentric with wheel well 18. Individual heat shield sections 42 may be secured in place between wheel well 18 and rotors 32 by respective heat shield carriers 44 fixed to wheel well 18. Air gap 46 is defined annularly between heat shield sections 42 and wheel well 18.

Torque bars 24 and heat shield carriers 44 can be secured to wheel 14 using bolts or other fasteners. Torque bar bolts 48 can extend through a hole formed in a flange or other mounting surface on wheel 14. Each torque bar 24 can optionally include at least one torque bar pin 50 at an end opposite torque bar bolts 48, such that torque bar pin 50 can be received through wheel web hole 52 in web 20. Heat shield sections 42 and respective heat shield carriers 44 can then be fastened to wheel well 18 by heat shield fasteners 53.

With reference to FIG. 2, one or more of the brake components described herein may be made using a field assisted sintering technique (FAST) device 200. FAST is also commonly referred to as plasma activated sintering (PAS). FAST is a technique that employs temperature, pressure, and high voltage to rapidly sinter powders into monolithic materials. In essence, FAST is a technique for pressure-assisted sintering activated by electrical discharges between powder particles. Brake components may be made using FAST to form the components using a mixture 212 of ceramic powder and fibers to form a ceramic matrix composite (CMC) in a short time period.

In various embodiments, the fibers may comprise chopped fibers. Mixture 212 is thus also referred to herein as CMC mixture 212. Examples of suitable fibers for use in mixture 212 may include carbon fibers, aramid fibers, silicon carbide fibers, or other types of fibers. Fiber filament diameters tend to be similar between different types. Fiber filaments may have diameters of substantially 5 μm (0.0002 in), 10 μm (0.0004 in), 20 μm (0.0008 in), 50 μm (0.002 in), or 100 μm (0.004 in), for example. In that regard, fiber filament diameters may range from 7 μm (0.0003 in)-15 μm (0.0006 in), 5 μm (0.0002 in)-50 μm (0.002 in), or 3 μm (0.0001 in)-100 μm (0.004 in). Length for chopped fiber may have a length ranging from 3.2 mm (0.125 in)-50 mm (2 in), 2.5 mm (0.1 in)-100 mm (4 in), or 2 mm (0.07 in)-254 mm (10 in). Fiber preform lengths may scale with the graphite mold up to the mold diameter.

In various embodiments, the fibers may be treated with an interphase layer applied to inhibit fiber sintering to the ceramic matrix. Examples of the interphase layer may include pyrolytic carbon or boron nitride. The addition of the interphase layer to the fibers may improve fracture toughness relative to other composites prepared using FAST without such a coating.

In various embodiments, mixture 212 may also include ceramic material in the form of ceramic powder. Suitable ceramic powders may include SiC, $B_4C$, and/or $Si_3N_4$, $TiB_2$, or other oxides and/or borides, for example, A range of particle sizes may be employed in the ceramic powder used to make the CMC brake components of the present disclosure. The particle size of the ceramic powder is also referred to herein as powder size. Typically, powder sizes in the micrometer or nanometer ranges are appropriate for FAST processing. For example, a micron-sized boron-carbide powder may be selected when the manufacturing tools are not suited to operate on nano-sized powders without the powders escaping from a die or mold. When chopped fiber is included in mixture 212, a nano-sized powder may infiltrate into the fiber more readily than the micron-sized powder. The powder size may include a particle size distribution such as a bimodal particle distribution. Powder size may thus be selected based on desired grain size with smaller powder sizes yielding smaller grain sizes. For example, nano-sized powder yields a smaller grain size than micrometer-sized powder. The grain size may impact the thermal properties of the finished component. Particle uniformity may vary. For example, particle uniformity may vary in diameter by +/−80%. Particle size may also vary according to a Gaussian distribution or by other industrially accepted variances.

In various embodiments, the upper size limit for powder may be defined by the inter-filament distance in a given tow bundle. This varies, but will be something on the order of the filament diameter, which may be substantially 5 μm (0.0002 in), 10 μm (0.0004 in), 20 μm (0.0008 in), 50 μm (0.002 in), or 100 μm (0.004 in), for example. Minimum size may be governed by commercial availability and the issues with potential escape from the graphite die if the powder is too small. For example, minimum powder sizes may be on the order of 10 nm ($4 \times 10^{-7}$ in), 50 nm ($2 \times 10^{-6}$ in), 100 nm ($4 \times 10^{-6}$ in), 500 nm ($2 \times 10^{-5}$ in), 5 μm (0.0002 in), 10 μm (0.0004 in), 20 μm (0.0008 in), 50 μm (0.002 in), or other suitable sizes.

In various embodiments, FAST device 200 may include a ring mold 214. Ring mold 214 may be an annular mold suitable for forming circular or annular CMCs. Ring mold 214 may be formed from various die materials including graphite, refractory metals, ceramics, or other suitable materials. Although a ring mold 214 is shown for exemplary purposes, other die shapes may be suitable for making non-circular brake components.

In various embodiments, FAST device 200 may also include at least one punch 210 to engage ring mold 214 along an inner diameter and apply pressure during the FAST process. Punch 210 may thus be an electronically or hydraulically actuated piston suitable for applying substantial force to a heated material. For example, punch 210 may apply 1,400 kN, 1,200 kN-1,600 kN, 1,000 kN-2,000 kN, or 800 kN-2200 kN of force to CMC mixture 212 by actuating within an inner diameter of ring mold 214 and compressing CMC mixture 212 along the axis of ring mold 214. In that regard, ring mold 214 may be well suited for use in forming annular or disc-shaped brake components such as friction disks.

In various embodiments, FAST device 200 may further include an electrode 208, which may be graphite, coupled to and/or in electronic communication with punch 210. An electrode 206, which may be brass, may be coupled to and/or in electronic communication with graphite electrode 208. Graphite electrode 208 may thus be disposed between punch 210 and brass electrode 206. A copper plate 204 may be coupled to and/or in electronic communication with brass electrode 206. Although copper, brass, and graphite are identified for illustrative purposes, various metallic or otherwise conductive materials may be used to form the electrodes of FAST device 200.

In various embodiments, transformer 216 may be in electronic communication with copper plate 204 to provide electrical current to mixture 212. Heat may be generated for the FAST process by dispersing electrical current through the electrodes, ring mold 214, punch 210, and/or mixture 212. An induction coil 202 may be disposed about ring mold 214 to provide inductive heating to CMC mixture 212, though resistance heating by dissipating electrical current through electrodes, ring mold 214 and mixture 212 may provide sufficient heat for densification absent induction coil 202 in various embodiments. Direct heating through resistance heating or otherwise may enhance densification over grain growth. Direct heating may further allow for fast heating and cooling rates, promote diffusion during the FAST process, and allow for the intrinsic properties of nano and micro powders to remain present in their fully dense product.

Figure 3A:
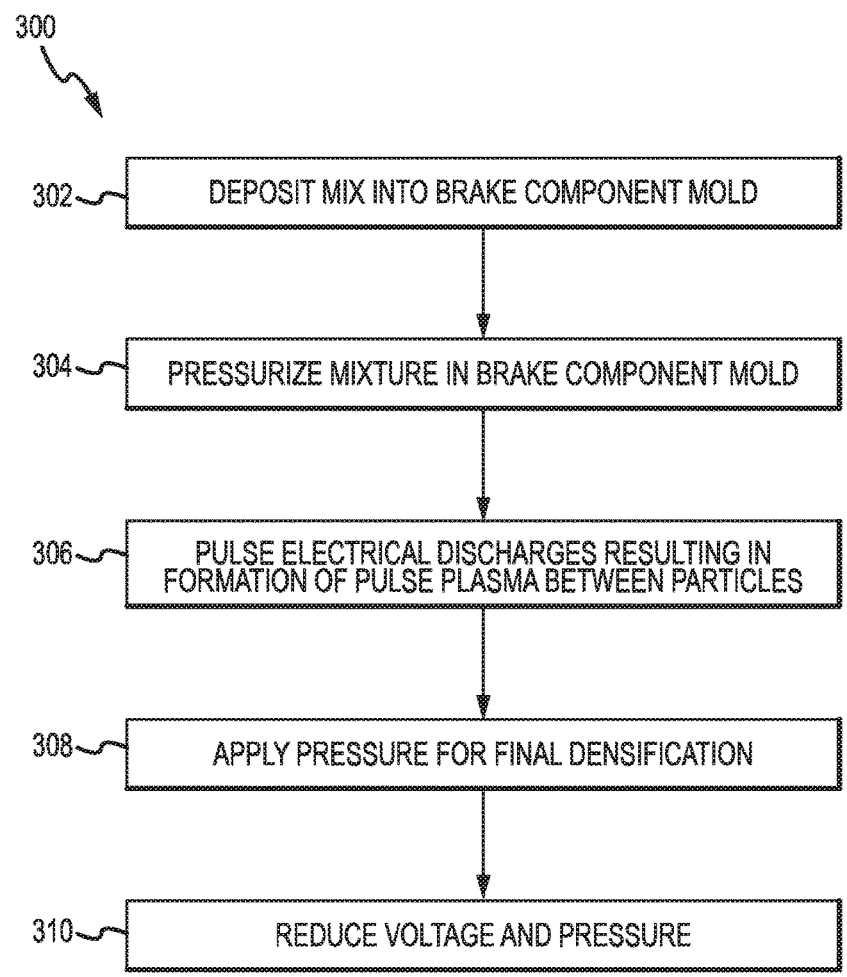
FIG. 3A illustrates an exemplary process for generating CMC brake components, in accordance with various embodiments.

With reference to FIGS. 3A and 3B, an exemplary process 300 is shown for making CMC brake components, in accordance with various embodiments. Process 300 may be completed using a FAST device 200 as disclosed in FIG. 2. Graph 301 depicts the various changes in temperature, pressure, and CMC density over the course of process 300. Process 300 may include mixing and/or depositing a mixture 212 into a ring mold 214 (Step 302). Mixture 212 may comprise ceramic powder and fibers, as described above. FAST device 200 may increase pressure applied to the mixture by actuating punch 210 to press against the mixture (Step 304). Step 304 may be performed over period 305. The pressing force applied by punch 210 may be substantially 100 tons (90,700 kg), 150 tons (136,078 kg), 200 tons (181,437 kg), or another suitable pressing force.

In various embodiments, the FAST device may pulse electrical discharges across the mixture (Step 306). Step 306 may be performed over period 307. The pulsed electrical current may flow through the ceramic powder along the boundaries of the ceramic particles making up the ceramic powder and, as a result, generate pulsed plasma between particles of the ceramic powder. Pulsed current may be applied using direct current. A typical cycle time for the CMC process may span 10 minutes, 15 minutes, or 20 minutes, for example. Current levels for the electrical pulses in FAST device 200 may vary depending on the machine. For example, the current levels may range from 2,000 A-20,000 A, 1,000 A-25,000 A, or 500 A-30,000 A. FAST device 200 may also operate with electronic energy levels of substantially 140 kVA, 200 kVA, or 240 kVA, for example. FAST device 200 may increase the temperature in the mold using resistance heating or other direct heating techniques described herein. FAST device 200 may apply pressure for final densification of the mixture (Step 308). Step 308 may be performed over period 309. Pressure may be applied using punch 210 as described above. Appropriate maximum heating temperatures may be selected based on the ceramic and fiber selected for mixture 212. Examples of appropriate maximum temperatures may include substantially 3000° C. (5432° F.), 2600° C. (4712° F.), 2400° C. (4352° F.), 2200° C. (3992° F.), or 2000° C. (3632° F.). The term substantially as to describe quantitatively measurable characteristics herein such as temperature and pressure shall refer to a variation in the quantitatively measurable characteristic ranging by +/−5%.

In various embodiments, the FAST device may reduce the voltage and the pressure at completion of the FAST process (Step 310). Step 310 may be performed over period 311. The resulting CMC brake component may be operated on further using milling, machining, or other techniques to refine the finished product. A suitable time to complete process 300 may be 1 hour, 2 hours, 5 hours, 10 hours, 20 hours or any other suitable time. The CMC FAST process may thus yield a CMC brake component in a period on the order of hours rather than days or weeks.

The FAST process may cause the ceramic particles to undergo vaporization, solidification, volume diffusion, surface diffusion, and/or grain boundary diffusion. As a result, the CMC brake components made using the processes and systems described herein may have a dense, monolithic grain structure. The dense, monolithic grain structure may have controlled proportions of ceramic to fiber resulting in a superior upper use temperature relative to components made using MI, for example. The CMC brake components can also be completed in a shorter period than similar components made using CVI or PIP.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one killed in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of making a ceramic matrix composite (CMC) brake component, the method comprising:
    increasing a pressure from a first pressure to a second pressure in a mold containing a mixture comprising a ceramic powder and fibers;
    pulsing an electrical discharge across the mixture to generate a pulsed plasma between particles of the ceramic powder;
    generating the CMC brake component in response to increasing a temperature from a first temperature to a second temperature in the mold using direct heating; and
    reduce the temperature and the pressure applied to the CMC brake component.

2. The method of claim 1, wherein the ceramic powder comprises an average particle size ranging from micrometers to nanometers.

3. The method of claim 1, wherein the ceramic powder comprises at least one of SiC, $B_4C$, or $Si_3N_4$.

4. The method of claim 1, wherein the fibers comprises at least one of chopped carbon fibers or chopped SiC fibers.

5. The method of claim 1, wherein the mold comprises at least one of graphite, a refractory metal, or a ceramic.

6. The method of claim 1, further comprising machining the CMC brake component.

7. The method of claim 1, wherein the direct heating comprises resistance heating.

8. The method of claim 1, wherein the direct heating comprises inductive heating.

9. The method of claim 1, wherein the CMC brake component comprises a CMC brake disc.

10. The method of claim 1, wherein the temperature is increased to a maximum temperature of substantially 2400° C.

11. The method of claim 1, wherein the pressure is increased by actuating a punch to press against the mixture.

12. The method of claim 11, wherein the electrical discharge is pulsed across the mixture through a graphite electrode coupled to the punch, a brass electrode coupled to the graphite electrode, and a copper plate coupled to the brass electrode.

13. The method of claim 1, wherein the electrical discharge is pulsed at a cycle time of substantially 10 minutes.

14. The method of claim 1, wherein the fibers are coated with an interphase layer.

15. The method of claim 14, wherein the interphase layer comprises at least one of pyrolytic carbon or boron nitride.

16. A method of making a ceramic matrix composite (CMC) brake component, the method comprising:
    applying a pressure to a mixture comprising ceramic powder and chopped fibers, wherein the ceramic powder comprises an average particle size ranging from micrometers to nanometers, wherein the chopped fibers are coated with an interphase layer;
    pulsing an electrical discharge across the mixture to generate a pulsed plasma between particles of the ceramic powder;
    generating the CMC brake component in response to increasing a temperature applied to the mixture from a first temperature to a second temperature using direct heating; and
    reducing the temperature and the pressure applied to the CMC brake component.

17. The method of claim 16, wherein the ceramic powder comprises at least one of SiC, $B_4C$, or $Si_3N_4$.

18. The method of claim 16, wherein the chopped fibers comprise at least one of chopped carbon fiber or chopped SiC fiber.

19. The method of claim 16, wherein the interphase layer comprises at least one of pyrolytic carbon or boron nitride.

* * * * *